Aug. 16, 1932.  S. M. HANSEN  1,871,790
COATING RIBBONS, TAPES, AND OTHER STRIPS
Filed Aug. 4, 1926   11 Sheets-Sheet 2
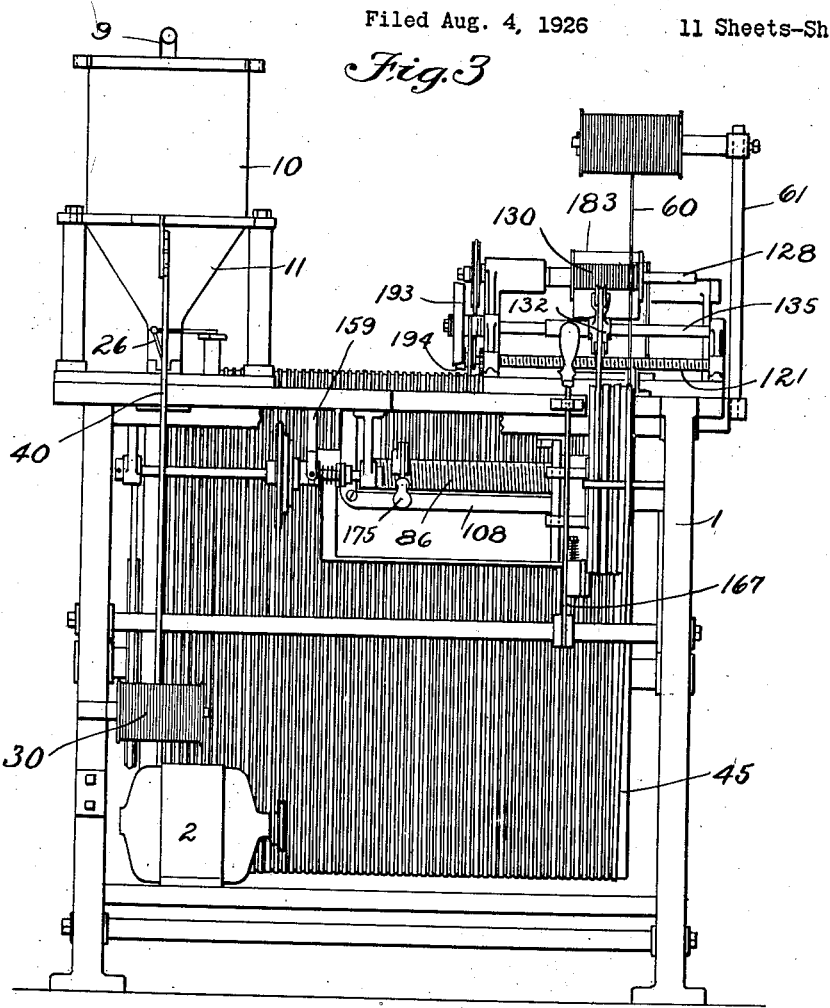
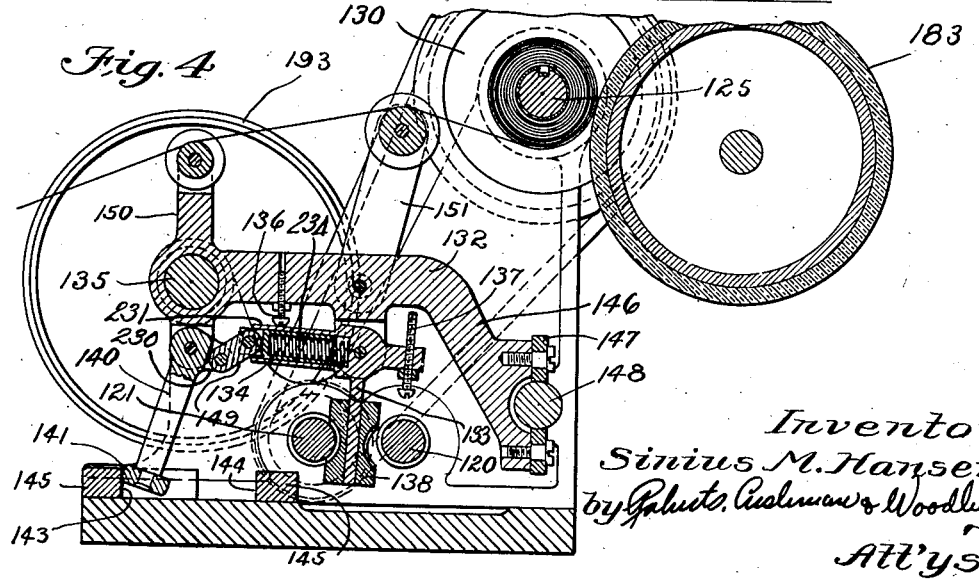
Inventor
Sinius M. Hansen

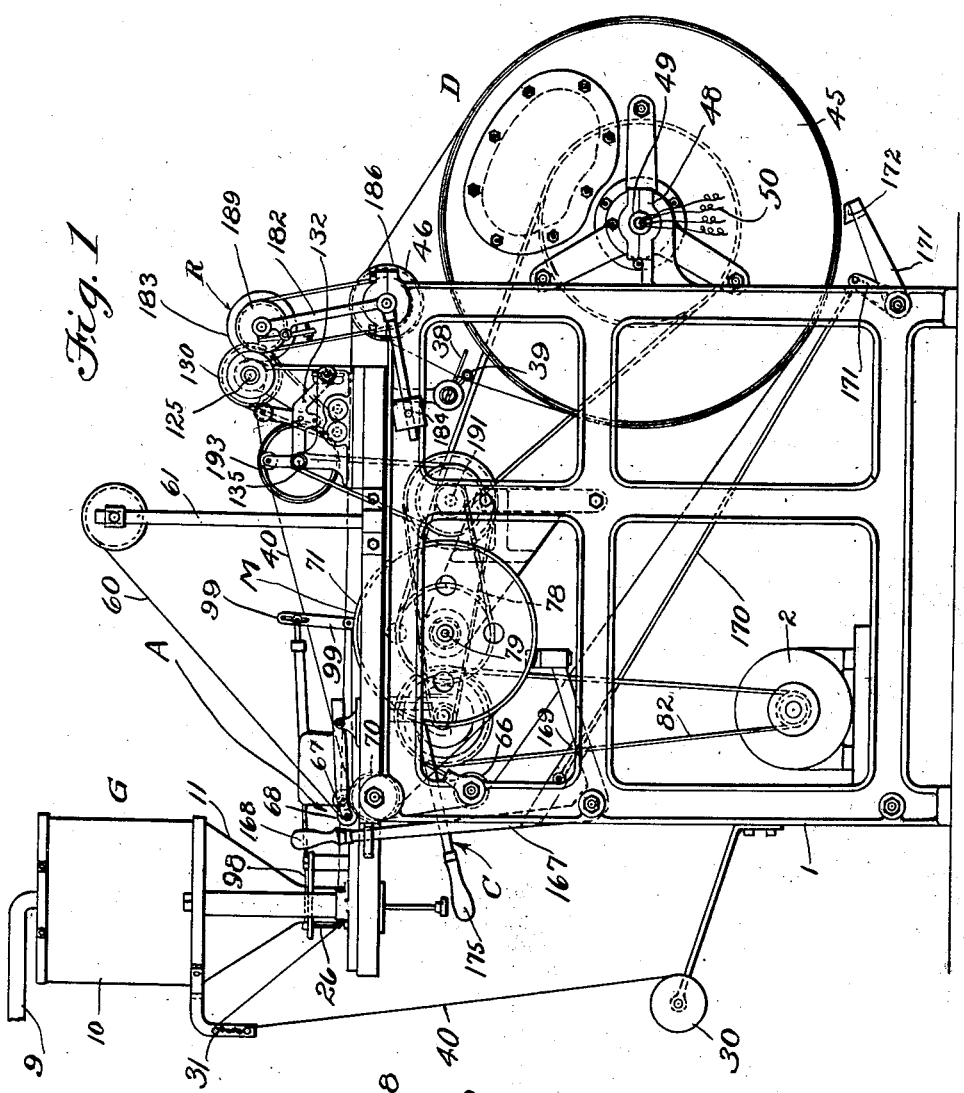

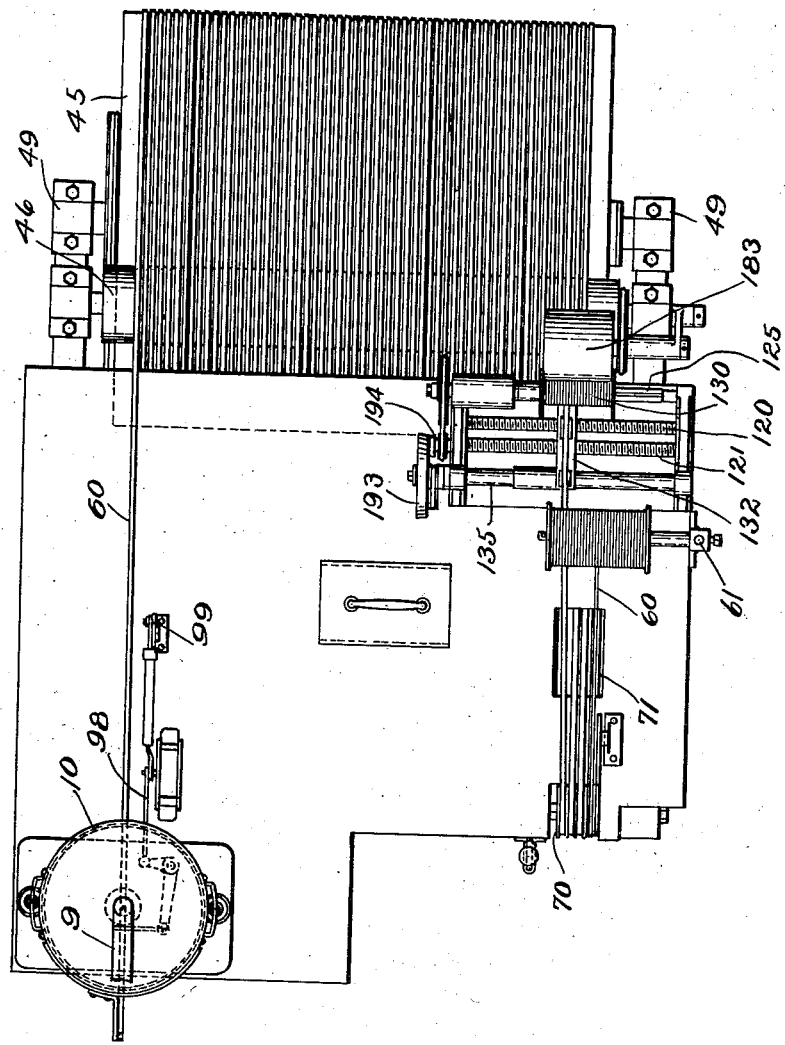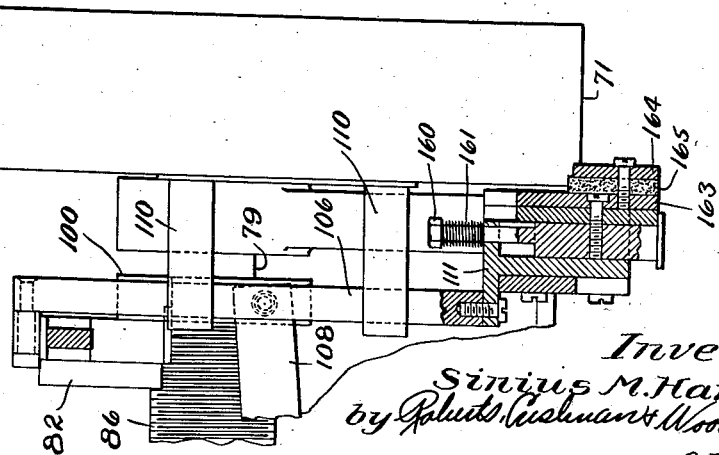

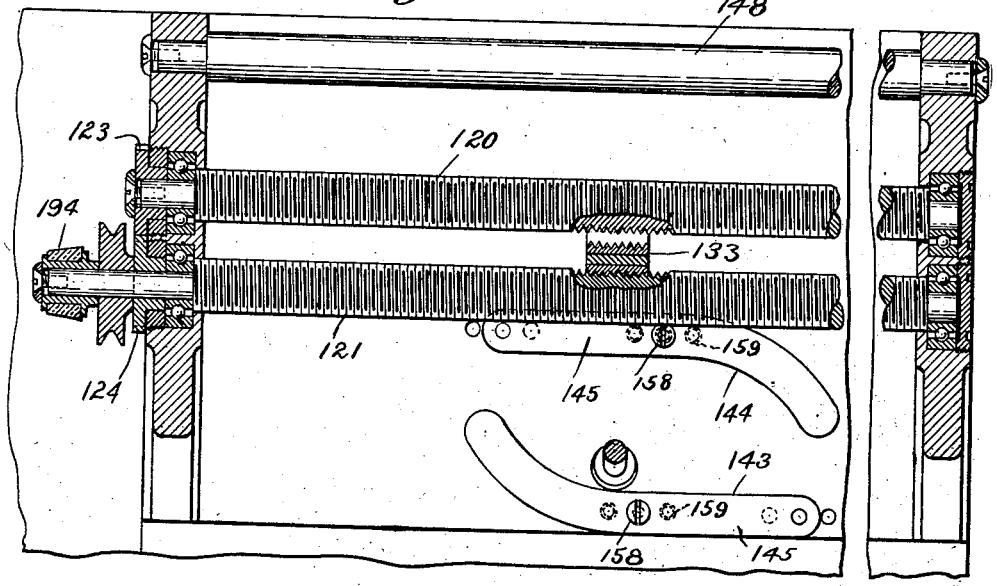
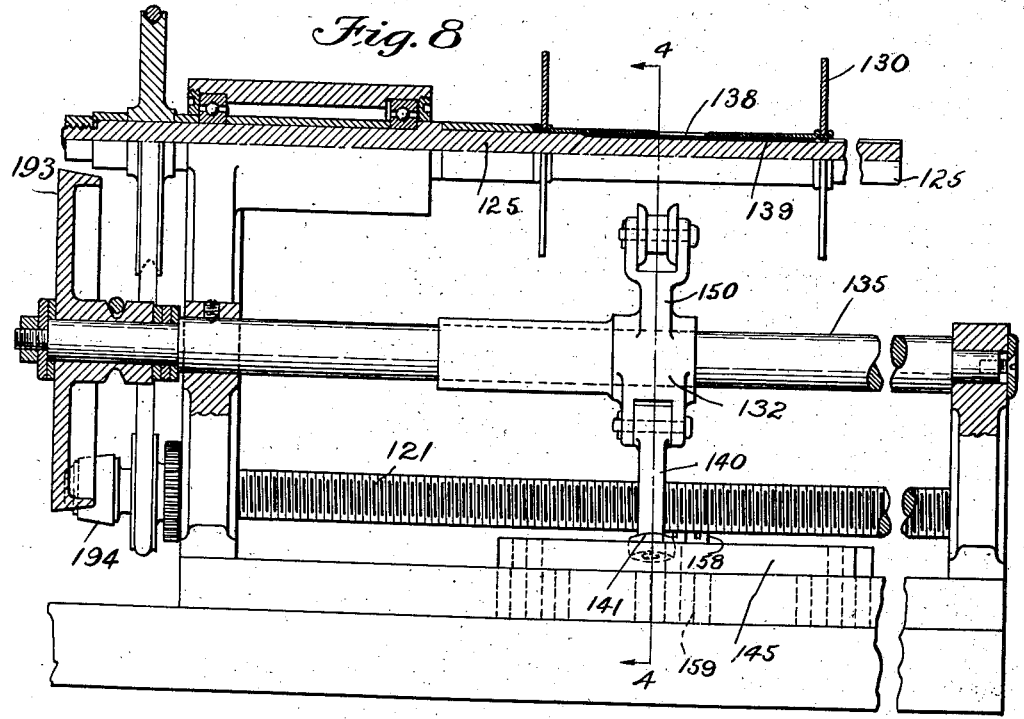

Aug. 16, 1932.　　S. M. HANSEN　　1,871,790
COATING RIBBONS, TAPES, AND OTHER STRIPS
Filed Aug. 4, 1926　　11 Sheets-Sheet 5
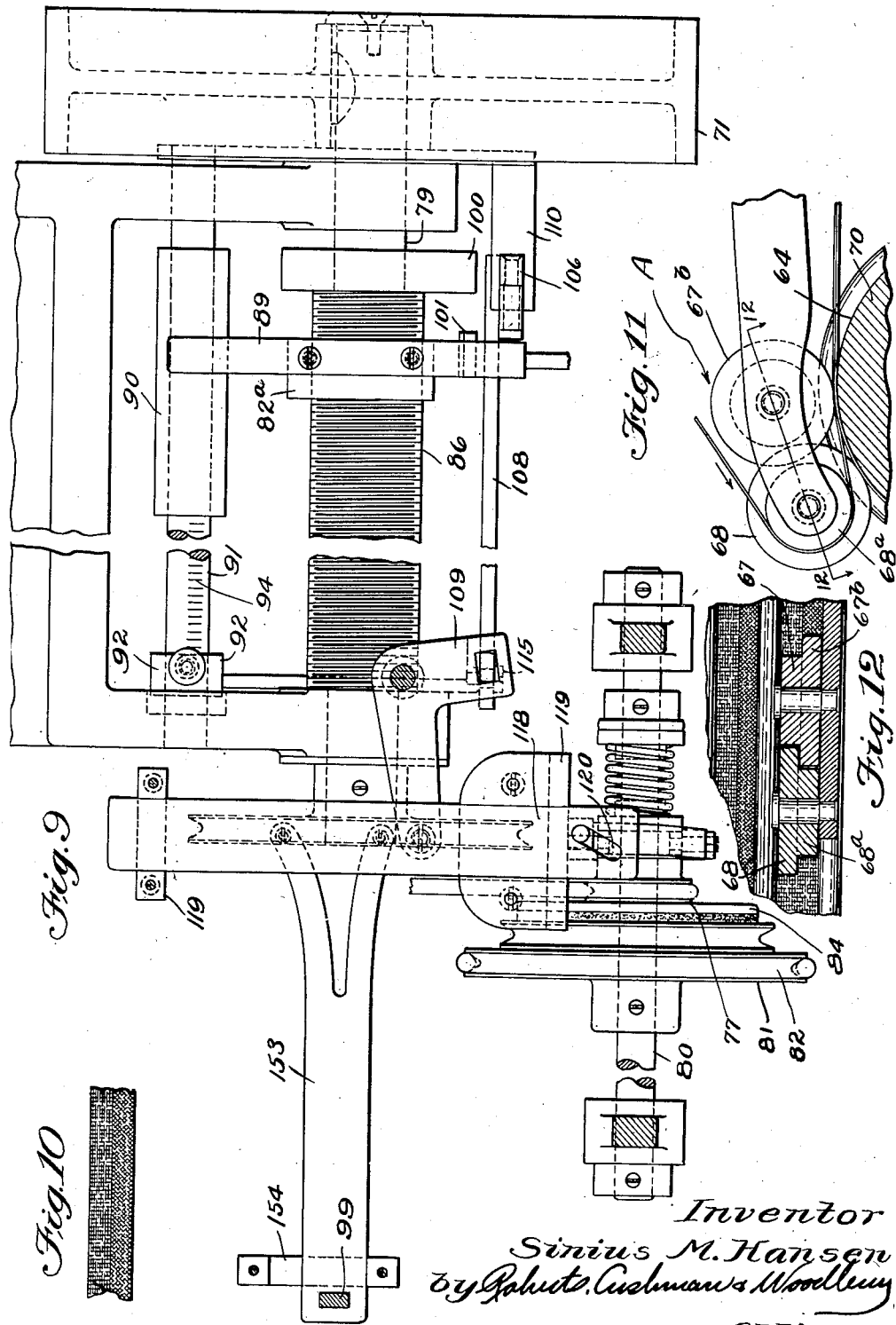

Aug. 16, 1932.                S. M. HANSEN                 1,871,790
                COATING RIBBONS, TAPES, AND OTHER STRIPS
                Filed Aug. 4, 1926          11 Sheets-Sheet 6
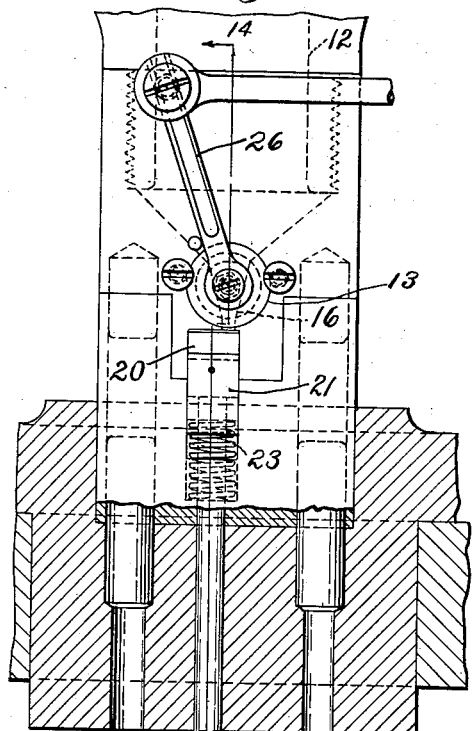
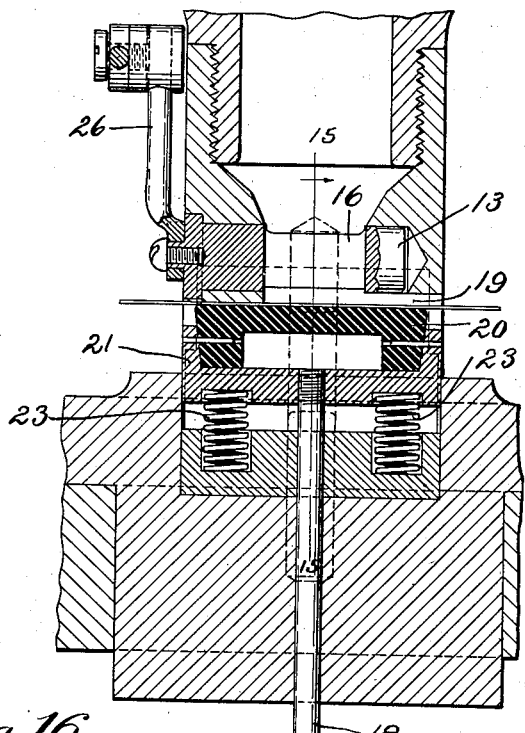
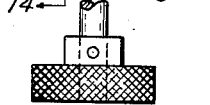
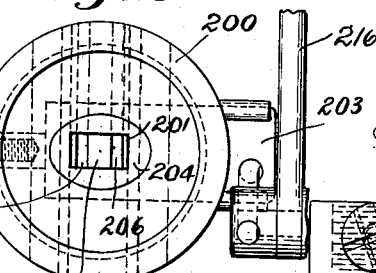
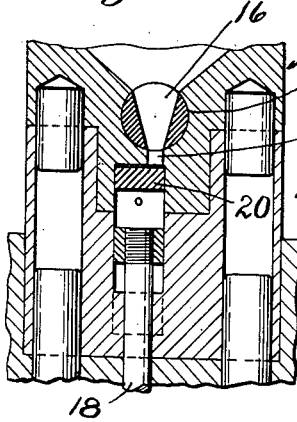
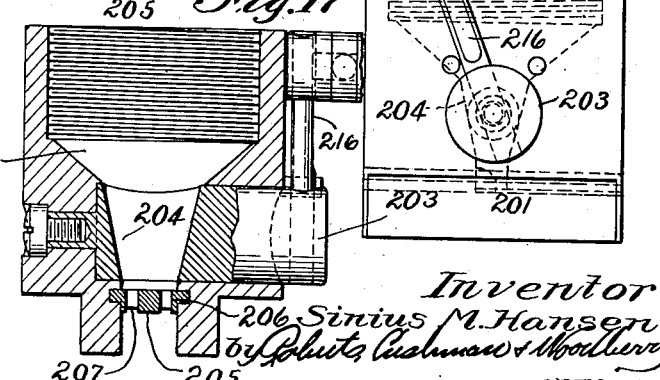
Inventor
Sinius M. Hansen
by Roberts, Cushman & Woodberry
Att'ys

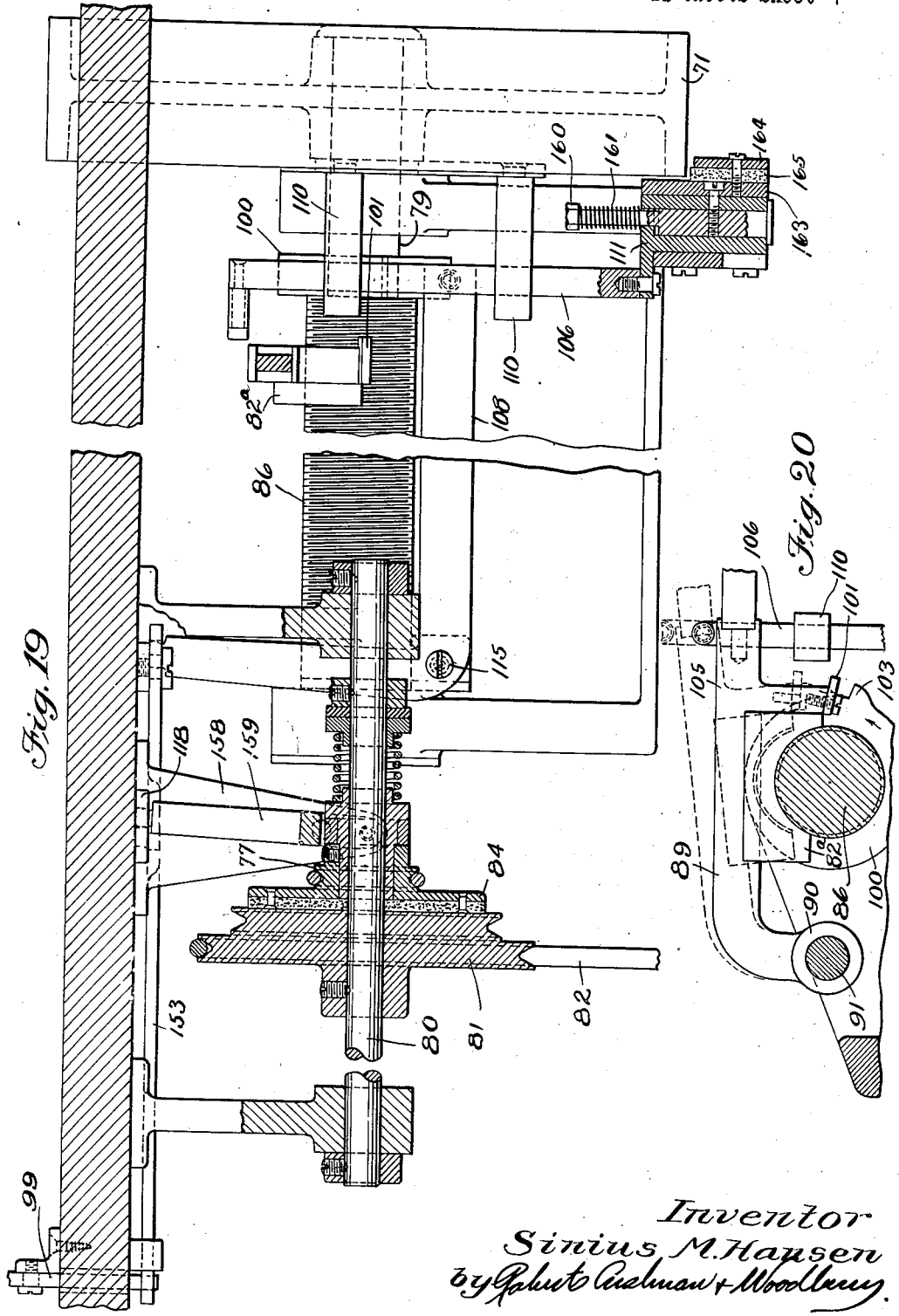

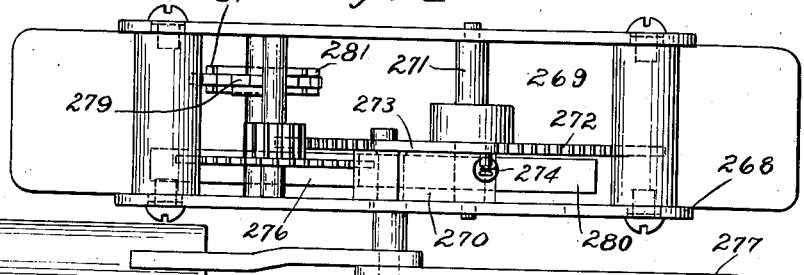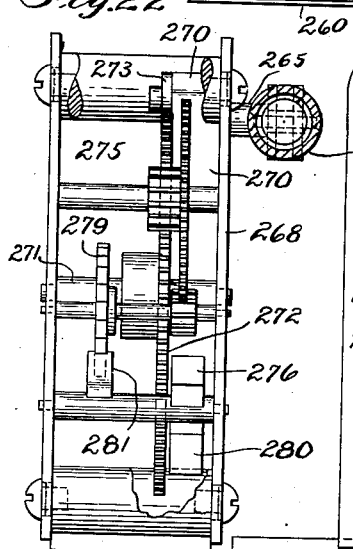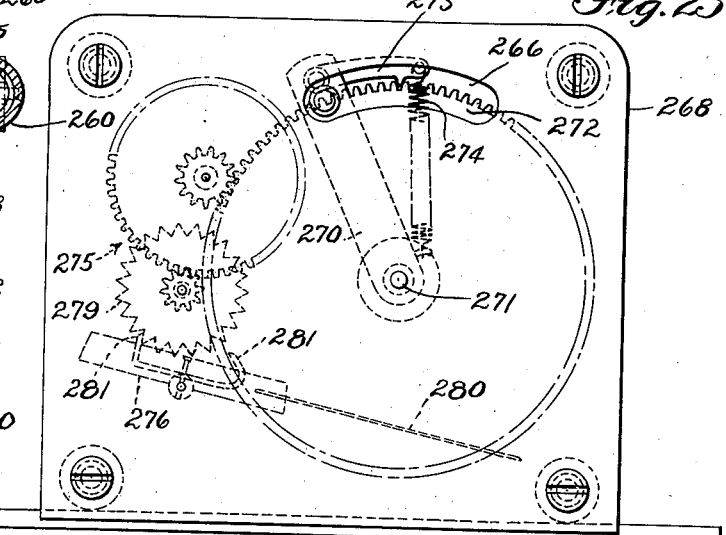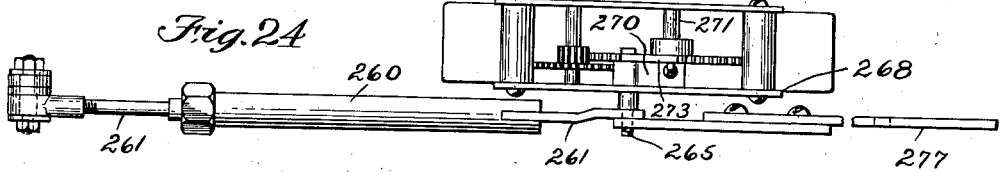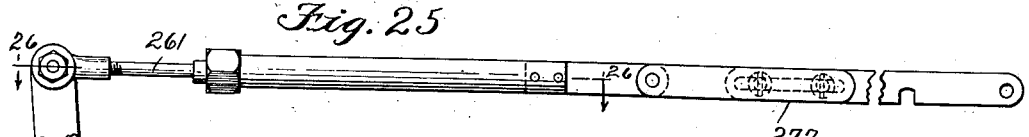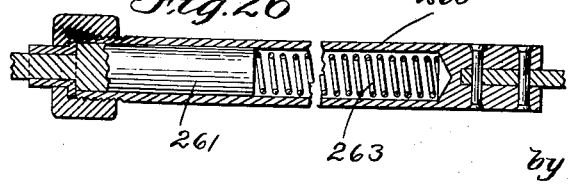

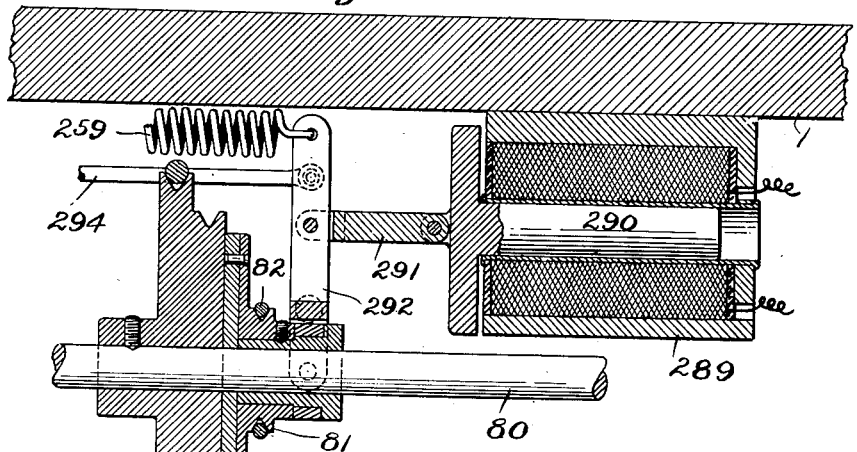
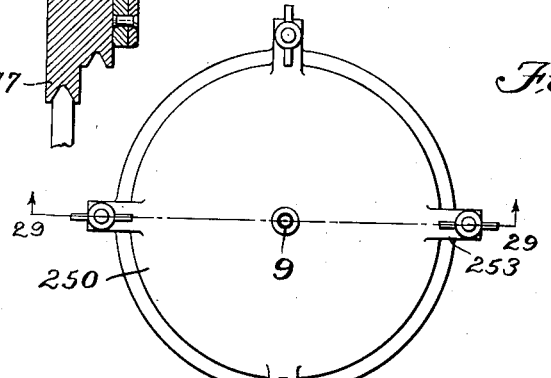
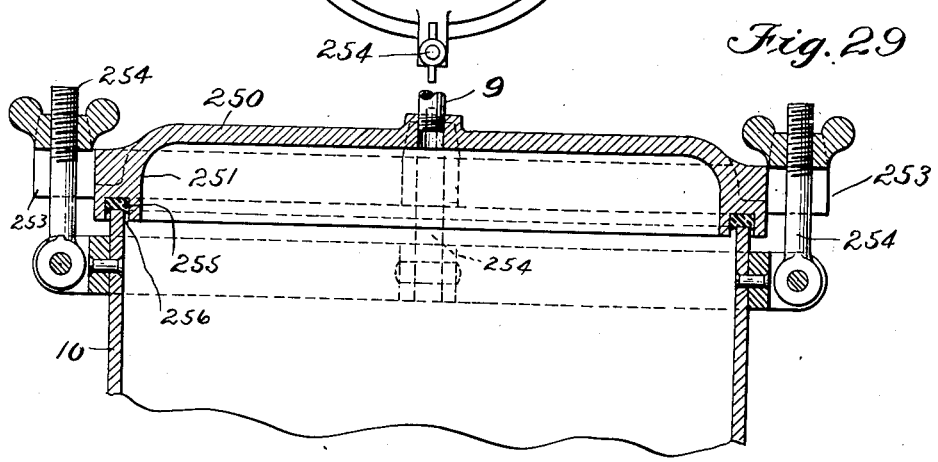

Aug. 16, 1932.  S. M. HANSEN  1,871,790
COATING RIBBONS, TAPES, AND OTHER STRIPS
Filed Aug. 4, 1926  11 Sheets-Sheet 10

Inventor
Sinius M. Hansen
by Roberts, Cushman & Woodberry
Att'ys

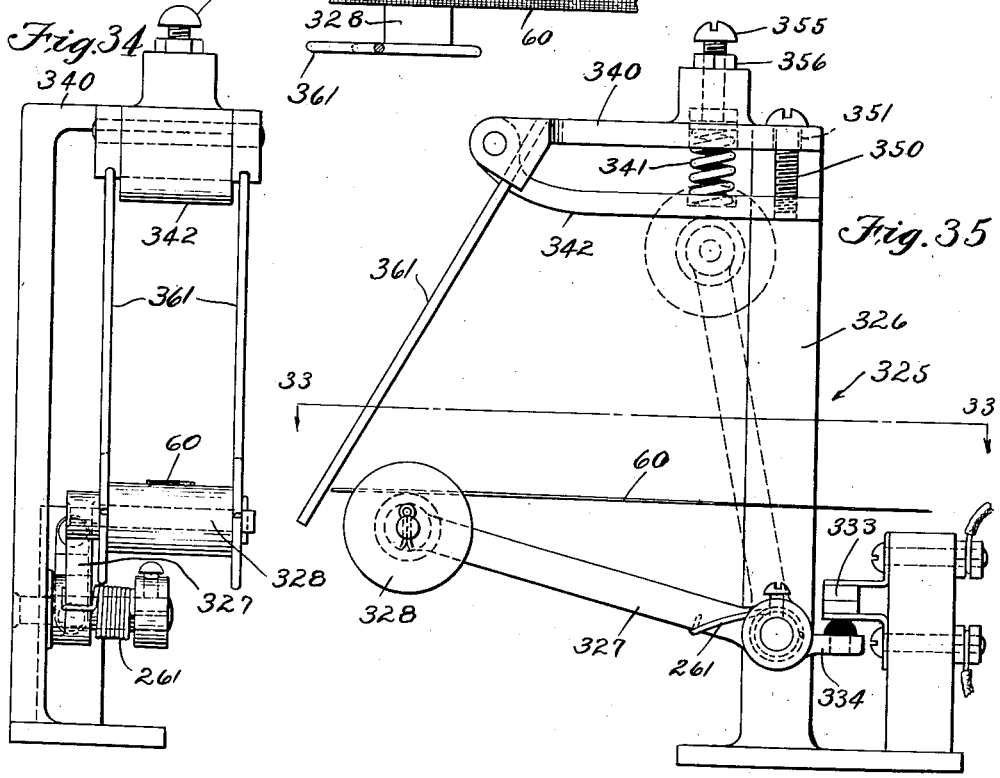

Patented Aug. 16, 1932

1,871,790

UNITED STATES PATENT OFFICE

SINIUS M. HANSEN, OF LYNN, MASSACHUSETTS, ASSIGNOR, BY MESNE ASSIGNMENTS, TO PARCO SPECIALTY CO., OF LYNN, MASSACHUSETTS, A CORPORATION OF MASSACHUSETTS

COATING RIBBONS, TAPES AND OTHER STRIPS

Application filed August 4, 1926. Serial No. 127,048.

This invention relates to a machine and method for producing adhesive tape in large quantities and preferably for producing tape having adhesive material applied to a portion only or spaced portions of its width and having said adhesive material covered with a removable strip of light fabric or the like. Tape of this character is suitable for many uses, for example, as binding tape for shoes or adhesive strips for surgical dressings, as disclosed in the copending applications Nos. 49,768 and 112,504, of Harold A. Evans, filed August 12, 1925, and May 29, 1926.

The improved machine forming the subject matter of this invention comprises means for applying semi-soft or pliable cementitious material to a portion of the width of the tape, means for drying the moving tape to permit the cementitious material to harden somewhat, means for applying the covering strip to the coated portion of the tape, means for reeling predetermined lengths of the completed tape upon spools, means for disconnecting the machine from its source of power automatically at intervals corresponding with the production of the predetermined lengths of tape, as well as auxiliary control means for automatically stopping the machine when the tape slackens or breaks and to prevent the machine being started when there is no tape in the machine and means for effecting the abrupt opening and gradual closing of the valve which controls the application of adhesive to the moving strip or tape.

The various novel features and combinations presented by this machine and method for producing adhesive strips are arranged to provide large quantities of tape in an efficient and inexpensive manner.

Further objects and advantages of the invention will be apparent to those skilled in the art upon a reading of the subjoined description and claims in conjunction with the accompanying drawings.

In the drawings,

Fig. 1 is a side elevational view of the machine;

Fig. 2 is a detail plan view with parts broken away and parts in section;

Fig. 3 is a front elevational view of the entire machine;

Fig. 4 is a section on line 4—4 of Fig. 8, additional parts also being shown;

Fig. 5 is a top plan view of the machine;

Fig. 6 is an elevational view of a portion of the clutch control mechanism, certain parts being shown in section;

Fig. 7 is a plan view of part of the reeling apparatus illustrated in Fig. 4, parts being shown broken away and in section;

Fig. 8 is an elevational view of the reeling mechanism;

Fig. 9 is a broken plan view of the clutch and its control mechanism, showing certain related parts;

Fig. 10 is a view of a fragment of the completed tape;

Fig. 11 is a detail elevational view of part of the mechanism for applying the covering strip;

Fig. 12 is a section on line 12—12 of Fig. 11;

Fig. 13 is a broken elevational view of the valve for controlling the application of adhesive;

Fig. 14 is a section on line 14—14 of Fig. 13;

Fig. 15 is a section on line 15—15 of Fig. 14;

Fig. 16 is a plan view of another form of valve mechanism;

Fig. 17 is a transverse sectional view of the second form of valve;

Fig. 18 is an elevational view of the valve shown in Fig. 16 and 17;

Fig. 19 is a view partly in section and partly in elevation of the clutch mechanism;

Fig. 20 is a sectional detail;

Fig. 21 is a view partly in section and partly in plan of a part of the valve control mechanism;

Fig. 22 is a view partly in side elevation and partly in section of the same;

Fig. 23 is an elevation of the same;

Fig. 24 is a plan view of the same with related linkage;

Fig. 25 is an elevation of the linkage;

Fig. 26 is a longitudinal section of a portion of the same;

Fig. 27 is a sectional view of the preferred clutch control mechanism;

Fig. 28 is a plan view of the container for adhesive;

Fig. 29 is an enlarged section on line 29—29 of Fig. 28;

Fig. 32 is a wiring diagram;

Fig. 33 is a plan view of a portion of the auxiliary control means;

Fig. 34 is an end elevation of the same; and

Fig. 35 is a side elevation thereof.

Figure 30:
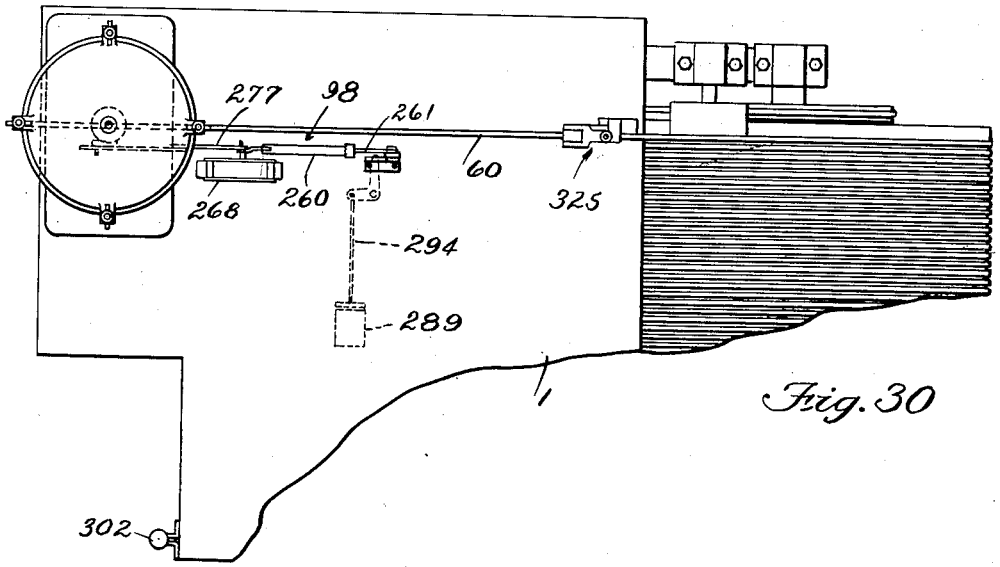
Fig. 30 is a plan view of a part of the machine, showing the relation of the valve control mechanism and the auxiliary control means to the rest of the machine.

The preferred form of my invention comprises a suitable table 1 supporting driving means such as an electric motor 2, an apparatus G for applying adhesive to the tape, a drying factor D, a measuring mechanism M, a control mechanism C related to the measuring mechanism M, means A for applying the covering strip to the coated portion of the tape and a reeling mechanism R.

Referring first to the means for applying cement or adhesive material to the tape, reference may be had to Figs. 1, 3, 13, 14 and 15. This portion of the machine is provided with a suitable receptacle or tank 10 to hold the adhesive material preferably in a semi-fluid or viscous state; preferably the tank is connected by pipe 9 with a suitable source of air pressure. In order to provide a convenient air-tight yet removable closure for the tank 10 I have provided a cover 250 having a depending rim 251 with outstanding slotted lugs 253 which are adapted to receive suitable fastening means 254 to clamp the cover in place. A compressible gasket 255 is inserted in an annular groove 256 in the lower part of the rim 251 and is adapted to be forced against the upper edge of container 10 in order to provide a substantially air-tight seal. The pipe 9 preferably may have a flexible section in order to permit the ready removal of cover 250 and replenishment of the adhesive contained within the receptacle. The bottom of the receptacle 10 may be tapered inwardly substantially in the form of a funnel as designated at 11 whereby the viscous cement may normally be concentrated in a restricted passage 12 above the valve indicated generally by the symbol V. This valve preferably comprises a cylindrical member 13 transversely disposed in pivotal relation with the restricted vertical extension 15 of passage 12. The cylindrical member is preferably provided with a diametrically disposed opening 16 adapted to be swung into alignment with the passage extension 15. A horizontally disposed opening 19, having a width substantially equal to that of the tape to be treated, is connected with the extension 15 as shown. At the lower part of this opening is a resiliently mounted block 20 of fiber or the like. It may be understood that block 20 is provided with a suitable supporting member 21 interposed between it and the light coil springs 23, whereby the tape may be resiliently yet firmly held against a surface 14 adjoining opening 15, which is adapted to cover the portion of the tape which is to remain uncoated.

A depending handle 18 is provided whereby the springs 23 may be compressed and the block 20 lowered to permit placing new tape in the valve, when desired. The end of opening 19, at which the tape leaves the valve, is enlarged in order to permit a suitable thickness of the adhesive material to remain upon the tape. It is to be understood that the width of the portion of the tape upon which the adhesive material is initially allowed to flow is somewhat narrower than the area which will eventually be covered by the adhesive and that opening 15 may be conveniently spaced somewhat from the adjoining margin of the tape, since normal tendency of the cement to spread upon the tape subsequent to or during the drying operation will result in the covering of the desired width with adhesive material (Fig. 15), or, if desired, a grooved shoe of the type hereinafter described with reference to the description of Figs. 16, 17 and 18 may be used with this type of valve especially when a thick viscous adhesive is used. Valve 13 may be controlled by a suitable lever 26 adapted to pivot the cylindrical member 13 with the opening 16 whereby the latter may be moved out of alignment with the opening 15 in order to stop the flow of adhesive. Use of air pressure within the tank 10 is desirable whenever a fairly heavy or viscous adhesive is used, in order to force the cementitious material through the valve passages.

In practice a spool of tape may be supported at any convenient point adjoining the valve mechanism as indicated at 30 in Fig. 1; a length of the tape between the spool and valve being passed through suitable holding means 31 so that it may be taut while passing through the valve. The holding means 31 may comprise a row of juxtaposed pins; the tape 40 being threaded about opposite sides of adjoining pins; it being understood that suitable means, which will presently be described, is provided for drawing the tape through the valve and unwinding it from spool 30.

Suitable drying means D is provided to receive the coated tape as it leaves the valve mechanism and somewhat to dry the semisoft cement applied thereto. Preferably this means comprises a large sheet metal drying drum 45 and a cooperating grooved roller 46 supported at one side of the table 1. Upon leaving the valve 13 the tape is directed over a groove at one end of roller 46, then around the drying drum and thereafter in consecutive turns about these members so that they are provided with a large number of windings of the tape. A considerable length of the tape may thus be exposed for drying, since it is necessary for a given part of the tape to be received in each of the grooves of roller 46 in succession and to pass over the drum for a like number of times. It is evident that during this drying operation, the tape must follow a somewhat spiral path, and means are provided to aid in holding the tape in this path, said means comprising a suitable comb 38, having projecting teeth located between the parallel tape sections, and an adjustably mounted guide bar 39 over the surface of which the tape sections may slide (Fig. 1).

Drum 45 may preferably be supported by outstanding brackets 48 holding a fixed tubular axial support 49, about which the drum may rotate. Member 49 is adapted to receive electrical connections; generally designated by the numeral 50, whereby electric heating means may be energized within the drum. The heating means may be of any desired form such as a series of resistance coils supported upon the fixed member 49. It may thus be seen that the temperature of the drum may be raised considerably above the temperature of the workroom whereby the drying operation may be accelerated.

Upon leaving the drum the tape is adapted to be engaged with mechanism A for applying the covering strip to the coated portion of the tape. This mechanism A is disposed adjoining the top of the stand or table 1 and comprises a swiveled arm carrying upon its free end a pair of juxtaposed rollers 67, 68. The covering strip 60 preferably may have a width equal to or a little greater than that of the coated portion of the tape (Fig. 10) and may be received from a freely rotatable spool mounted on any convenient support 61. Rollers 67 and 68 preferably may have stepped portions of different diameters which are arranged in oppositely disposed juxtaposition (Fig. 11). Preferably the smaller portion 68ᵃ of the outer roller 68 has a width slightly greater than that of strip 60. The weight of these rollers and the outer end of their supporting arm yieldably holds them against one groove of an adjoining roller 70 upon which the tape is received from a guide roller 66 after leaving the drum 45. Weight of the arm and rollers 67 and 68 is thus adapted lightly to press strip 60 into engagement with the coated portion of tape 40 whereby the coated portion is temporarily covered with the strip; it being understood that the cementitious material by this time has been rendered somewhat tacky, but still is adapted adhesively to engage the covering strip. During this operation the side of the larger portion 68ᵇ of roller 68 and the opposite wall 64 of the groove upon member 70 are adapted to guide the strip accurately upon the tape held in the groove, the enlarged portion 67ᵇ serving to press the strip into engagement with the tape.

The roller 70 is provided with a plurality of grooves, and the periphery of the adjoining drum or pulley 71 has a plurality of turns over which the covered tape is adapted to be moved. Consequently a considerable length of the covered tape is exposed for further drying and firm frictional engagement of the tape with drum 71 is insured; the last-named feature being important since member 71 comprises an essential part of the measuring mechanism, being so dimensioned that a given length of tape, as, for example, a yard, will pass over it during each revolution. The drum 71 is consequently connected to the clutch throw-out or control mechanism designated in general by the symbol C so that that mechanism may be actuated in synchronism with the passing of a given length of tape over the measuring device.

It may be understood that members such as the various previously described drums 45 and 71 are driven from motor 2 in synchronized relation and that the various driving connections between the related parts will be more fully described below. For the purposes of present description, however, it will suffice to note that the drum 71 is disposed on a shaft 79, which is connected by a belt 78 to an adjoining shaft 191, hereafter to be known as the main counter shaft of the machine, which in turn is driven from a pulley 77 on a shaft 80. Upon shaft 80 is disposed a suitable pulley 81 connected by driving means such as a belt 82 with the electric motor 2. Interposed on drive shaft 80 between pulleys 77 and 81 is a disk clutch 84 comprising a fabric-faced member designed normally to be held in engagement with a face of pulley 81, whereby the main countershaft and various related rolls and drums of the machine may be driven. It is desirable when the measuring drum 71 has been rotated for a given number of turns corresponding to a given length of completed tape, as for instance a spool of a certain number of yards, to effect declutching of the mechanism in order to permit the manual removal of the spool, installation of a new spool and repetition of the operation. For this purpose a suitable screw 86 is provided upon the intermediate portion of shaft 79, and is engageable by the half nut 82ᵃ which is supported upon the outer end of the pivoted arm 89, the opposite end of arm 89 being pivotally mounted on the guide by a collar 90. The guide 91 is provided with a suitable adjustable stop 92 and with suitable graduations 94, whereby the stop 92 may be fixed at any predetermined point to vary the length of the path of collar 90 and the corresponding length of tape to be manufactured during each operation or to be provided for each spool.

The nut 82ª is adapted normally to be moved along the screw 86 during the rotation of shaft 80. At the end of screw 86 adjoining drum 71 is disposed a cam throw-out member indicated in general by numeral 100. A projecting pin 101 upon the nut 82ª is adapted to be engaged with a shoulder 103 on the cam 100, whereby the nut may be thrown upwardly out of engagement with the threaded portion 86 of the shaft. (Fig. 20).

A projection 105 upon the member 89 is adapted to engage a pin in the vertically movable link 106 which is retained in U-shaped guides 110 and has its lower end secured to a grooved connecting block 111. Pivotally secured to the midportion of the link 106 is a bell crank 108 which is disposed upon a horizontal pivot 115 and operatively engages one end of a second bell crank 109 with a vertically disposed central pivot. The opposite end of the latter engages a horizontally slidable block 118 disposed in the hangers 119 and having a cam groove 120 at one end above the clutch 84. An upwardly projecting rod 159, with its intermediate portion pivotally mounted on a depending bracket 158, is adapted to have a pin at its upper end slidably engaged in the cam groove and to have its lower end pivotally engaging a collar adjoining the friction clutch whereby the clutch may be operated by disengagement of the nut 82ª from the screw 86, which imparts movement to the link 106, bell cranks 108 and 109 and rod 159. Connected to the intermediate portion of the sliding block is an outstanding arm 153 (Fig. 9) with its outer end supported in a U-shaped hanger 154 fastened to the lower surface of the table top and engaging the lever 99 connected by link 98 to lever 26, whereby the valve V may be automatically closed when the clutch is disconnected.

The clutch throw-out mechanism is also adapted automatically to apply brakes to prevent continued movement of the rollers and pulleys. For this purpose the lower end of the link 106, comprising connecting block 111, is yieldably connected by a bolt and spring, 160 and 161 respectively, to a pair of metal plates 163 and 164 having a block 165 of leather or similar fibrous friction material clamped therebetween, adjoining the periphery of drum 71, so that vertical movement of the link 106 is adapted to bring the friction material 165 into engagement with the revolving drum to comprise a brake. Preferably this block is supported at one end of a bell crank lever 167 (Fig. 1) the other arm of which comprises an upwardly extending control lever 168. Connected to a suitable part of bell crank 167, as the diagonal brace 169, is a rod 170 operatively connected with a bell crank 171 having a suitable friction block 172 disposed adjoining the drying drum 45 whereby the block 172 is frictionally engaged with that drum upon an analogous disposition of the block 165, as upon disconnection of the clutch. It will now be evident that the clutch 84 may be disconnected either automatically by the cam 103 at the end of the path of nut 82ª along screw 86, or that it may be manually thrown out at any time by the lever 168, and that, simultaneously, brakes 165 and 172 will serve to overcome the momentum of the revolving rollers and drums, while valve V will be closed through lever 99 and its connecting linkage.

Upon the outstanding projection 105 of nut 82ª is a substantially horizontally extending handle 175, the lifting of which will serve to move the nut 82ª out of engagement with any part of screw 86, whereby the former may be adjusted or moved to the beginning of its path as defined by the position of collar 92, as when collar 92 is adjusted on guide 91 or when the machine is restarted after automatic disengagement of the clutch.

The tape upon leaving the apparatus for applying the covering strip is directed to the reeling mechanism whereby it is wound upon a spool 130. Referring more particularly to Figs. 2, 4, 7 and 8, it may be seen that the reeling mechanism comprises a pair of parallel threaded shafts 120 and 121 connected by the meshed gears 123 and 124 respectively as well as a spool-carrying shaft 125 located above shafts 120 and 121 and driven from the latter by means of a belt and pulleys. Shaft 121 is driven by the friction rollers 193 and 194 (Fig. 8) to permit slippage in order to compensate for the variable diameter of wound tape. The spool 130 may be secured upon shaft 125 in any suitable manner, as by having an indentation 138 engage a keyway 139 in that shaft.

A shaft 135 mounted above but to one side of screws 120 and 121 comprises an axle for friction roller 193 and a supporting and guiding element for a bracket 132. This bracket is provided with a pivoted depending arm 133 to which is secured a nut 138 having threaded portions upon its opposed faces which may alternately engage the screw-threaded shafts 120 and 121.

A depending arm 140 is pivoted to the bracket 132 below the shaft 135 and has a roller 141 secured to its lower end and an outstanding lug 230 connected to a short link 149. This link is pivoted to one member of a telescoping casing 231, the other member of which is an extension of the upper part of arm 133. Within telescoping casing 231 is located a spring 234, tending to force the telescoping members apart and having its central axis substantially aligned with the pivot of the depending arm 133 and with the adjoining pivot of link 149. Suitable stops 136 and 137 are adapted to limit the pivotal movement of the member 133 and consequently the movement of the link and the arm 140 connected thereto. The roller 141 is adapted alternately to engage guide surfaces 143 and 144 respectively which are formed on suitable plates 145 secured upon the table 1. Preferably the guide surfaces of these plates are similar but oppositely disposed in the manner illustrated in Figs. 2 and 7. The relation of the link 134 to the pivots of the depending members 133 and 140 is such that the arm 140 is thrown over abruptly from a position wherein the roller is engaging surface 143 to a position wherein it is engaging surface 144, such a movement taking place due to the throwing of link 149 by its central position in relation to the pivots at the ends of spring 234. It may thus be seen that rotation of shaft 120 or 121 will move the bracket 132 in one direction or the other therealong, but that the depending control arm 140 with the operating roller 141 will swing abruptly from engagement with one cam surface to the other, as the curved portion of the plate is reached and the spring is compressed, thereby moving arm 133 from engagement with one screw-threaded rod to the other and changing the movement of that member as well as the entire bracket 132. Due to the rapid throwing of the arm 140 and nut member 133 from one position to another, piling up of the tape at the ends of the spool is prevented and an evenly wound spool or reel results.

Projecting upwardly from bracket 132 are a pair of uprights 150 and 151 respectively, the former being fixed in relation to the bracket and the latter being adjustably mounted in relation to the same. Each of these upstanding members is provided with a grooved roller designed to guide the tape upon the spool. A rearwardly extending portion 146 of the bracket is adapted to have a part 147 in engagement with a guide rod 148 so that rotation of the bracket about shaft 135 is prevented.

It is to be understood in practise that the reciprocating movement of the bracket 132 coincides in its extent with the width of the spool mounted on the shaft 125, whereby the tape is moved back and forth over a distance corresponding to the width of the spool, and that plates 145 may be secured to the table by screws 158 which are adapted to be engaged in any one of a plurality of holes 159 (Fig. 7), whereby the relative position of cam surfaces 143 and 144 may be adjusted to coincide with the widths of spools of various sizes.

An auxiliary mechanism is provided adjoining the face of the spool 130, comprising a horizontally pivoted bell crank 182 pivotally supporting a friction roller 183 at its upper end having a driving pulley 186 aligned with its intermediate pivot which may also provide the axis for the roller 46 previously described. Upon the substantially horizontally disposed arm of the bell crank 182 is a suitable weight 184 adapted to normally hold the friction roller 183 in engagement with the intermediate portion of spool 130 or rather with the tape wound upon that portion of the spool. Preferably the roller 183 has a width substantially equal to the width of the portion of the spool usually wound with tape and it is covered with material having a comparatively high frictional co-efficient, such as rubber. A suitable belt connects the pulley 186 and pulley 189 which is connected to roller 46, whereby the friction drum 183 may be operated through the drying drum 45, the plurality of turns of tape about that drum and the roller 46 and thus through pulleys 186 and 189. Preferably the frictional engagement of the roller 183 with the tape upon the spool permits the winding of the tape with only a moderate degree of tightness, especially when the diameter of the winding is comparatively large, thus overcoming the tendency to draw the tape too tightly about the spool during the last part of the winding operation. Thus a spool may be obtained in which the various windings are arranged with substantially uniform tightness.

It now remains to describe one preferred manner in which the various rotatable rollers, drums, pulleys and the like may be operated from the common power source 2 through the clutch 84. As previously described, shaft 80 is connected with the electric motor 2 by a suitable pulley 81 and belt 82. A belt 78 is disposed upon a pulley connected to clutch 84 whereby it may be disconnected from the driving mechanism by the disconnection of the clutch. Belt 78 is operatively connected to a pulley upon the countershaft 191 which in turn is connected by a suitable belt to shaft 79, thus driving the measuring and clutch throw-out mechanism. Countershaft 191 is also connected by a suitable belt to the drying drum D which in turn is designed to rotate the rollers 46 and 183 in the manner previously described. Countershaft 191 is also operatively connected by a suitable belt to the friction cone 193 whereby the screws 120 and 121 and the spool 130 are rotated.

It may be understood that the roller 70 is operated through the plurality of windings of tape from the drum 71 and that the adjoining rollers are similarly driven by frictional contact with the roller 70 or the tape thereupon. While I prefer to drive the various elements of the machine with driving means permitting a degree of slippage, such as belts, it is obvious that positive driving means such as gearing or chains may be substituted in whole or in part for the same.

While the preferred form of my machine is particularly intended to apply adhesive material to one marginal portion only of a flexible tape, it may be evident that it may also be used for coating the entire surface of such a tape, if desired, or to coat separate parallel areas of the tape or strip; therefore in Figs. 16, 17 and 18 I have disclosed one form of valve which may be used for coating the two marginal portions of one face of the tape. The valve 200 as illustrated in these figures comprises a substantially cylindrical extension adapted to be fitted upon the lower part of tank 10 and to provide a passage 201 with a transversely disposed cylindrical member 203 pivotally mounted to locate an opening 204 in registration therewith. A suitable control lever 216 may be secured to the member 203 to shut off the valve in the same general manner as illustrated with reference to valve member 13 of Fig. 13. A suitable shoe 205 may be located in the valve member beneath the opening 204. This shoe may preferably be made of metal and be provided with suitable passages 206 which are adapted to conduct the adhesive to the desired portions of the tape; for example, the openings 206 in the shoe disclosed herein are adapted to coat the spaced portions of the tape adjoining opposite margins thereof and to leave the central portions uncoated.

The shoe 205 is provided with grooves 207 upon its lower surface connecting with ends of openings 206 and having a comparatively shallow depth in order to vary the thickness of the adhesive coating upon the tape. Preferably the shoe 205 may be interchangeable with a plurality of other shoes having passages and grooves with different dimensions and/or spacing. It is understood that the thickness of the grooves 207 may vary in these various interchangeable shoes in order to provide adhesive coating of various thicknesses to suit various types of cementitious material which may be used and to suit various uses. The shoe 205 as well as the block 20 with which it is adapted to cooperate may be renewed when wear would result in the inaccuracy of these members.

In many instances it is desirable to use a comparatively heavy viscous cement rather than a light, freely flowing cement; the heavier cement having the advantage of not running so freely and being more easily confined to the desired portions of the tape, and the heavier cement also has the advantage of not soaking through the tape or the temporary covering, which is likely to be a characteristic fault of the lighter, freer flowing adhesive.

The shoe 205 obviously may have a single passage in order to cover approximately the full width of the strip with adhesive or to cover one marginal portion thereof in the manner illustrated in Fig. 15 or any other desired portions, or the passage may be arranged in various other ways in order to suit particular purposes. It is to be clearly understood that the shoe 200 is equally useful in the type of valve shown in Fig. 13 and that the use of the shoe with the double passages is shown merely as a matter of convenience in illustration.

In a machine of this character the taut ribbon or tape will tend to continue its movement through the valve as the machine is stopped, and it is therefore desirable to delay the closing of the valve or in other words to have such a closing take place gradually. For this purpose link 98 may preferably comprise telescoping sections 260 and 261 which are normally held in an extended position relative to each other by an expansible spring 263. Preferably one section 260 of the expansible link is pivotally connected to an outstanding pin 265 oscillatable in slot 266 in an appropriate casing 268 for the time limit mechanism 269 (Fig. 21).

The time limit mechanism comprises a radially disposed arm 270 rotatably mounted on shaft 271 and carrying the outstanding pin 265 which connects with the telescoping link. The member 270 may be actuated by the movement of spur gear 272 by means of a ratchet connection comprising detent 273 controlled by a light spring 274 and normally engaging the toothed periphery of gear 272. The latter member, which is also mounted on shaft 271, is connected with a suitable escapement control through a train of gearing designated in general by the numeral 275. The oscillatable escape lever 276 is provided with a suitable weight 283 and outstanding air resistance leaf 280, and has pallets 281 adapted alternately to be rocked into engagement with the toothed periphery of escape gear 279 of the gear train, thus permitting gradual movement of the train of gears, arm 270, pin 265 and link 98 as the latter is compressed to close the valve. A second link 277, preferably adjustable in length, extends from pin 265 to the control lever 26 of the valve V. With this mechanism, when the clutch is thrown out and the brakes are applied either by hand, or automatically due to the action of the measuring device, the telescoping link 260 is compressed and radial movement of arm 270 is initiated. Such a movement must necessarily be gradual, however, due to the delayed action of the escapement mechanism, thereby resulting in the gradual closing of the valve and the gradual shutting off of the flow of adhesive upon the tape so that the valve will not be fully closed until slightly after the rolls, drum etc. have stopped moving. Such a feature is desirable, since the taut tape tends to creep through the valve and to slacken slightly when the machine is stopped, and by proper design and adjustment of the time limit mechanism, coating of the tape will continue as the machine is being stopped and the possibility of bare, uncoated spots upon the tape will be avoided. When the link 98 is moved in the opposite direction due to the starting of the machine, the telescoping sections 260 and 261 function as a solid link, and detent 273 slides over the toothed periphery of gear 272 permitting the quick opening of valve V.

Figure 31:
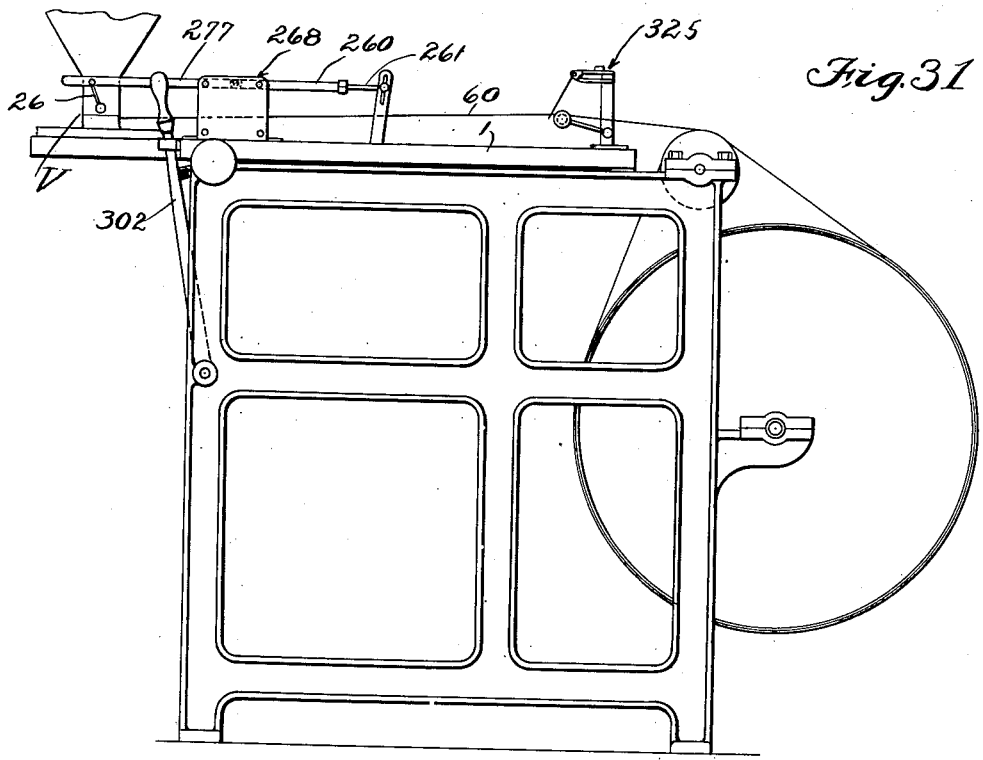
Fig. 31 is a similar elevational view.

Figs. 27, 30 and 31 illustrate an alternative, but a preferred form of control mechanism adapted to throw out and engage the clutch 84 and to control the valve V. Referring more particularly to Fig. 27, it may be noted that a suitable solenoid 289 is located beneath the table 1 and is adapted to move an armature 290, which is connected by a short link 291 with the clutch throw-out lever 292 and the link 294 which controls the valve, whereby energization of the solenoid causes the clutch to be engaged and the valve to be opened. A spring 259 tends to swing lever 292 so that the clutch is disengaged when the solenoid is not magnetized. Preferably the solenoid may be energized by an electric circuit controlled by a switch 300, one contact 301 of which is carried upon an appropriate control lever 302 (Fig. 32) similar to the lever 167 illustrated in Fig. 1, which is adapted in the first movement to open the switch 300 and thereafter to apply the brakes 165 and 172. Switch 300 also preferably controls the circuit for the motor 2, whereby opening of the switch simultaneously effects the declutching of the mechanism and the stopping of the motor, and closing of the switch results in the starting of the motor and the simultaneous throwing-in of the clutch. The automatic clutch throw-out mechanism comprising nut 82 and link 106 is adapted to swing lever 302 when the half nut has traveled to the end of screw 86, thus opening switch 300 and stopping the mechanism, the bell crank 109 and related linkage preferably being omitted with this type of clutch control.

An electrically controlled clutch actuating mechanism of this character is advantageous, since it is adapted to effect the abrupt movement of the lever 292 and of the link 294 in order to open the valve 13 abruptly and to initiate flow of the adhesive, as the machine and the tape is being accelerated to its normal speed. Such a feature is desirable since the natural viscosity of the adhesive tends to make the initial flow thereof comparatively slow, and, in order to avoid bare spots or thin coating of the tape at the points corresponding to the starting of the machine, quick opening of the valve is essential. Although the clutch may thus be thrown in rapidly, the fact that the motor is started simultaneously and must necessarily build up its speed prevents the sudden starting of the rolls, etc. and any objectionable sudden jerking of the ribbon.

In order to prevent continued movement of the drum, rolls, etc. when the tape slackens or breaks as well as to prevent starting of the machine when the tape has not been properly located therein, it is desirable to provide a suitable auxiliary automatic control mechanism designated in general by the numeral 325. Preferably this mechanism may be located upon table 1, adjoining the portion of the strip 60 which extends from the valve V to the drying drum, this portion of the strip being normally taut due to the effect of the comparatively restricted dimensions of the passage through the valve and the holding means 31 in conjunction with the windings of the tape about the drum 45. The auxiliary control means 325 comprises a suitable upstanding bracket 326 having a pivotally mounted arm 327 secured near its lower portion with a guide roller 328 at the outer end of the arm adapted to receive the tape or strip 60. A spring 261 normally tends to swing roller 328 upwardly against tape 60 and an extension 334 of arm 327 bears against a resilient support comprising a part of a spring switch 333 which is interposed in the circuit which energizes solenoid 289 and motor 2. When the strip or ribbon is taut, it will tend to hold the member 334 in such firm engagement with spring switch 333 that the latter will be maintained closed and the current may pass therethrough. Assuming, however, that ribbon 60 breaks or slackens, the spring 261 tends to swing arm 327 upwardly, moving extension 334 away from switch 333 and permitting that switch to fly open, or if the ribbon is not properly located in the machine starting thereof is normally prevented by this auxiliary control mechanism.

The upper portion of upright 326 supports an outstanding arm 340 provided with a downwardly extending compressible spring 341 which engages a member 342 pivoted to the outer end of the arm 340. A suitable screw 350 or the like is freely movable through opening 351 in arm 340 and threaded into the member 342 in order to comprise an adjustable stop limiting the downward movement thereof. A second screw 355 provided with a lock nut 356 projects through the arm 340 and is adapted to vary the degree of compression of spring 341. Member 342 is so disposed in relation to the path of roller 328 that upward movement of the latter, when the strip 60 breaks or slackens, will force the ribbon into engagement with the lower surface of member 342 so that it will be resiliently gripped between that member and the roller 328; a frictional drag thus being provided for the slackened or severed ribbon in order to keep a loose portion thereof from engaging adjoining parts of the mechanism or other portions of the ribbon. In order to insure upward movement of the ribbon in the proper manner under such conditions, suitable guide members, such as a pair of wires 361, extend downwardly from bracket 340 to a point adjoining the lower position of roller 328 at either side of the normal path of the ribbon, thus preventing transverse movement of the same in relation to its normal path. Preferably auxiliary control mechanism 325 is located comparatively close to the drying drum as disclosed more particularly in Fig. 31, since the tape will usually break near the point where it is first subjected to considerable tension, i. e. in the vicinity of the valve 13; and thus a considerable length of tape may pass over the roller 328 as the machine is being stopped by the opening of switch 323 and the action of the brakes, and thus there will be little likelihood of the broken end of the tape or ribbon passing beyond the frictional retarding means provided by roller 328 and member 342.

Referring to the wiring diagram of Fig. 32, it may be seen that there is a main switch 340 connecting the machine with any suitable source of current and that the circuits for both motor 2 or solenoid 289 may be de-energized by opening the switch 300 by the movement of control lever 302 which also applies the brakes, or that these circuits may be opened automatically by mechanism 325 and switch 333 when the ribbon slackens or breaks; in this instance the frictional drag of the members 328 and 342 upon the ribbon tends to aid the deceleration of the rollers, drums, etc. of the machine. In either case demagnetization of the solenoid causes the closing of valve V, which will be gradual, however, due to the effect of the escapement mechanism.

While the foregoing description and disclosure has been applicable more particularly to the preparation of a tape or a strip of ribbon of comparatively restricted width, the width of the grooves and dimensions of the various parts of the machine may be varied to receive comparatively wide strips or sheets and these sheets may be spread with adhesive to any desired degree or to any desired width without departing from the method disclosed herein. In the case of a strip which has its entire surface or spaced portions coated with cementitious material it may be desirable to cover the full width instead of a part of the width of the tape with a temporary covering strip and in such a case rollers corresponding to the stepped rollers 68 and 67 may be provided and have a width substantially equal to that of the groove in the roller areas.

A further development of and improvement upon the mechanism for applying a covering or protecting strip to the adhesive layer upon the coated ribbon is disclosed and claimed in Patent No. 1,811,477 to George L. Preble.

I claim:

1. In a machine of the class described, mechanism for applying adhesive material to a moving tape, means for partially drying the applied adhesive comprising a rotatable drying drum of comparatively large diameter, a cooperating roller about which a plurality of turns of tape are disposed with the adhesively coated surface exposed, and guiding means located between the drum and roller and adapted to maintain the turns of tape in proper spaced relation, as a given part of the tape is moved over the roller and drum in alternate succession.

2. In a machine of the class described, mechanism for applying adhesive material to a moving strip, comprising structure providing a passageway having a cross-sectional size substantially conforming to that of the strip, said structure providing an opening into said passageway to permit the flow of adhesive upon the strip and a groove in the top of said passageway in the direction of strip movement, said groove being narrower than the passageway and adapted to determine the width and depth of the adhesive layer upon the strip.

3. In a machine of the class described, mechanism for applying adhesive material to a moving strip, comprising structure providing a passageway having a cross-sectional size substantially conforming to that of the strip, a detachable shoe having a lower surface which comprises the upper wall of said passageway, an opening in said shoe, substantially narrower than said passage and connecting with a source of adhesive supply.

4. In a machine of the class described, mechanism for applying adhesive material to a moving strip, comprising structure providing a passageway having a cross-sectional size substantially conforming to that of the strip, a detachable shoe having a lower surface which comprises the upper wall of said passageway, an opening in said shoe, substantially narrower than said passage, a source of adhesive supply communicating with said passage, and a groove in the lower surface of the shoe extending from the opening in the direction of strip movement and having a width and depth substantially to determine the section of adhesive coating upon the strip.

5. A machine of the class described comprising a duct for applying coating to a moving tape, a valve closable to interrupt flow through the duct, and controlling means for opening and closing the valve, said controlling means, when actuated to open the valve, being automatically operable to cause the valve to open abruptly and when actuated to close the valve being operable automatically to cause the valve to close gradually.

6. In a machine of the class described, mechanism for moving a flexible strip of fabric or the like, control means for starting and stopping said mechanism, said mechanism being adapted to hold a part of the moving strip in a normally taut position, means engaging this part of the strip and connected to the control means automatically to stop the mechanism when said part of the strip slackens from its taut position, said means which engages the strip being adapted frictionally to grip and retard the same, upon a slackening thereof which effects the stopping of the mechanism.

7. In a machine of the class described, mechanism for moving a flexible strip of fabric or the like, said mechanism being adapted to hold a part of the moving strip in a normally taut position, electromagnetic control means for starting and stopping said mechanism, a switch having a contact carrying part held in engagement with another contact by the taut portion of the strip, said switch being in circuit with the electromagnetic circuit and being adapted to effect the opening of the circuit and the stopping of the mechanism and strip, when the said part of the strip is relaxed from its normally taut position.

8. In a machine of the class described, mechanism for moving a strip of fabric to be coated, a valve controlled nozzle for application of coating material to the strip, abruptly movable, electrically controlled means for starting and stopping the mechanism and consequently the strip movement, a connection between said means and the valve abruptly to open the latter.

9. In a machine of the class described, mechanism for moving a strip of fabric to be coated, a valve controlled nozzle for application of coating material to the strip, abruptly movable, electrically controlled means for starting and stopping the mechanism and consequently the strip movement, a connection between said means and the valve abruptly to open the latter, and time limit mechanism associated with said connection to cause gradual closing of the valve in response to abrupt movement of the control means.

10. In a machine of the class described, mechanism for moving a strip of material by a coating nozzle, an electric motor for operating said mechanism, a clutch between said motor and mechanism, an electromagnet for controlling said clutch and simultaneously operable switches controlling said magnet and motor whereby the clutch may be engaged and the motor started simultaneously or the clutch disengaged and the motor stopped simultaneously.

11. A machine of the class described comprising a coating nozzle, mechanism for drawing a strip past the nozzle and normally holding the strip taut, said mechanism being arranged so that a taut run of the strip is normally disposed adjoining the nozzle, driving means for said mechanism, a valve closable to interrupt flow through the nozzle, and control means having a part normally to contact the taut run of the strip, a yieldable element urging said part out of its normal position when the run is broken or slackens, said control means thereupon being operable to stop operation of the driving mechanism and to close the valve, and also being operable frictionally to engage the material.

12. A machine of the class described comprising a duct, a valve associated with the duct for applying coating to a moving tape, said valve being closable to interrupt flow through the duct, controlling means for opening and closing the valve adapted to open the same abruptly and to close it gradually, said means comprising telescoping links resiliently held in extended position, and time limit mechanism adapted to permit the return of the links to said position from a collapsed position.

13. A machine of the class described comprising mechanism for moving a flexible strip of fabric or the like, a nozzle for coating the movable strip, a valve closable to prevent flow through the nozzle, control means for stopping and starting the mechanism and the movement of the strip, a connection between said means and the valve to delay closing of the latter when the mechanism and strip are stopped and abruptly to open the valve when the mechanism and tape are started.

14. In a machine of the class described, mechanism for moving a flexible strip of fabric or the like, a nozzle for coating the moving strip, a valve closable to prevent flow through the nozzle, control means for stopping and starting the mechanism and the movement of the strip, a connection between said means and the valve to delay the closing of the latter when the mechanism and tape are started, said connection comprising an escapement controlled element to effect the delayed closing of the valve.

Signed by me at Boston, Massachusetts, this 30th day of July, 1926.

SINIUS M. HANSEN.